United States Patent
Paralkar et al.

(10) Patent No.: US 12,429,140 B2
(45) Date of Patent: Sep. 30, 2025

(54) COOLANT CONTROL VALVE

(71) Applicant: Schaeffler Technologies AG & Co. KG, Herzogenaurach (DE)

(72) Inventors: Raghunath Paralkar, Rochester Hills, MI (US); Kartik Gangshettiwar, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/381,698

(22) Filed: Oct. 19, 2023

(65) Prior Publication Data

US 2025/0129855 A1    Apr. 24, 2025

(51) Int. Cl.
- *F16K 5/20* (2006.01)
- *F01P 7/14* (2006.01)
- *F16K 5/06* (2006.01)
- *F16K 11/087* (2006.01)

(52) U.S. Cl.
CPC ............ *F16K 5/201* (2013.01); *F16K 5/0689* (2013.01); *F16K 11/0876* (2013.01); *F01P 2007/146* (2013.01)

(58) Field of Classification Search
CPC .... F16K 5/201; F16K 5/0689; F16K 11/0876; F01P 2007/146
See application file for complete search history.

(56) References Cited

U.S. PATENT DOCUMENTS

| | | | | |
|---|---|---|---|---|
| 3,533,597 | A * | 10/1970 | Bolling | F16K 11/0873 251/174 |
| 4,685,488 | A * | 8/1987 | Corbin | F16K 5/201 137/328 |
| 6,401,754 | B1 * | 6/2002 | Winquist | F16K 11/0876 251/174 |
| 8,820,706 | B2 * | 9/2014 | Kawauchi | F16K 5/205 251/315.01 |
| 9,670,825 | B2 * | 6/2017 | Murakami | F01P 3/20 |
| 9,695,734 | B2 * | 7/2017 | Carns | F16K 5/0605 |
| 9,897,217 | B2 * | 2/2018 | Greene | F16K 5/201 |
| 10,280,829 | B2 * | 5/2019 | Shen | F01P 7/165 |
| 10,295,066 | B2 * | 5/2019 | Kaczmar | F16K 31/041 |
| 10,295,076 | B2 * | 5/2019 | Russalian | F01P 7/16 |
| 10,344,883 | B2 * | 7/2019 | Brazas | F16K 11/0876 |
| 10,352,460 | B2 * | 7/2019 | Jang | F16K 5/0678 |
| 10,358,969 | B2 * | 7/2019 | Dutta | F03G 7/06 |
| 10,513,968 | B2 * | 12/2019 | Yumisashi | F16K 5/06 |
| 10,514,103 | B2 * | 12/2019 | Yumisashi | F16K 27/067 |

(Continued)

FOREIGN PATENT DOCUMENTS

| | | | | |
|---|---|---|---|---|
| CN | 107228109 | A * | 10/2017 | |
| DE | 102011077669 | A1 * | 12/2012 | ........... F16K 31/105 |

(Continued)

*Primary Examiner* — David Colon-Morales

(57) ABSTRACT

A coolant control valve is provided that includes an actuator, a rotary valve body, a valve housing, a seal housing, and a movable seal. The rotary valve body is rotatably actuated by the actuator and includes at least one fluid opening. The movable seal is arranged within an annular groove of the seal housing and is: i) sealingly engaged with the annular groove, and ii) forcibly sealingly engaged with the rotary valve body via a force generator. The force generator is arranged radially adjacently to the movable seal within the annular groove.

20 Claims, 13 Drawing Sheets

(56) References Cited

U.S. PATENT DOCUMENTS

| | | | | |
|---|---|---|---|---|
| 10,591,069 B2* | 3/2020 | Russalian | ............. | F16K 5/0605 |
| 10,704,455 B2* | 7/2020 | Akase | ................ | F01P 7/16 |
| 10,794,488 B2* | 10/2020 | Yagi | ................ | F16K 5/201 |
| 10,865,888 B2* | 12/2020 | Grosskopf | ............. | F16K 5/201 |
| 10,927,972 B2* | 2/2021 | Murakami | ........... | F16K 31/002 |
| 11,079,028 B2* | 8/2021 | Hashimoto | ............ | F16K 5/205 |
| 11,149,627 B2* | 10/2021 | Sano | ................ | F16K 5/061 |
| 11,149,862 B2* | 10/2021 | Kanzaki | ............. | F16K 11/0876 |
| 11,306,645 B2* | 4/2022 | Sano | ................ | F16K 5/201 |
| 11,333,258 B2* | 5/2022 | Sato | ................ | F16K 31/535 |
| 11,536,371 B2* | 12/2022 | Nakayama | ............ | F16K 5/181 |
| 11,732,635 B2* | 8/2023 | Jung | ................ | F16K 5/201 |
| | | | | 123/41.08 |
| 11,971,116 B2* | 4/2024 | Tochigi | ................ | F01P 7/14 |
| 2010/0230624 A1* | 9/2010 | Tejamo | ................ | F16K 5/201 |
| | | | | 251/315.16 |
| 2013/0081583 A1 | 4/2013 | Weiss et al. | | |
| 2014/0291566 A1* | 10/2014 | Yokoyama | ............ | F16K 5/0689 |
| | | | | 251/315.01 |
| 2018/0340620 A1* | 11/2018 | Wicher | ................ | F16K 5/0631 |
| 2020/0141671 A1* | 5/2020 | Lou | ................ | F16K 5/00 |
| 2021/0047959 A1* | 2/2021 | Jafari | ................ | F16K 5/0647 |
| 2022/0146003 A1* | 5/2022 | Yu | ................ | F16K 11/0876 |

FOREIGN PATENT DOCUMENTS

| | | | | |
|---|---|---|---|---|
| EP | 2902631 A1 | 8/2015 | | |
| EP | 4056880 A1 * | 9/2022 | ............... | F01P 7/16 |
| EP | 3730822 B1 * | 7/2023 | ............ | F16J 15/021 |
| JP | 2013145041 A | 7/2013 | | |
| WO | WO-2018149448 A1 * | 8/2018 | ............... | F01P 7/14 |
| WO | WO-2018169081 A1 * | 9/2018 | ............ | F16K 11/076 |

* cited by examiner

|  | Flow State A | Flow State B | Flow State C |
|---|---|---|---|
| Out1 (first outlet) | 0% (no flow) | 0%<X%≤100% | 0%<X%≤100% |
| Out2 (second outlet) | 0%<X%≤100% | 0% (no flow) | 100% - X% |

COOLANT CONTROL VALVE

TECHNICAL FIELD

The disclosure relates in general to a coolant control valve (CCV) for use within fluid cooling systems.

BACKGROUND

CCVs are known and can be arranged to provide coolant flow control for temperature management of various powertrain components of battery electric vehicles (BEV), hybrid electric vehicles (HEV), and fuel cell vehicles (FCV).

A portion of CCVs are electro-mechanical in design, incorporating an electrical actuator that interfaces with a mechanical valve body to provide a controlled flow of coolant for a selected powertrain/propulsion component or system. Depending on its design, the mechanical valve body can be linearly actuated or rotary actuated by an actuator, often times in the form of an electric motor or solenoid. The valve body can be configured with one or more fluid openings that control an amount of coolant flow to or from one or more inlets or outlets arranged on an outer housing of the coolant control valve. Example embodiments of electro-mechanical CCVs include: i) an on/off type that provides either a fixed coolant flow state or a no-flow state, or ii) a fully variable type that provides continuously variable positions of the valve body to achieve various coolant flow rates. CCVs that offer reduced packaging space (i.e. compact designs) are desirable for cooling systems of passenger vehicles.

SUMMARY

An example embodiment of a coolant control valve (CCV) includes an actuator with an actuator housing, a rotary valve body (RVB), a valve housing, a seal housing, movable seal, and a force generator. The RVB is actuated about a first axis by the actuator. The RVB has at least one fluid opening that is configured to rotate about the first axis. The valve housing includes an inlet and an outlet. The seal housing corresponds to one or both of the inlet or the outlet and has a first annular groove. A movable seal is disposed within the first annular groove and can move along a second axis arranged orthogonal to the first axis to sealingly engage a spherical segment of the RVB. The movable seal includes a first seal portion that is sealingly engaged with the first annular groove and a second seal portion that is sealingly engaged with the RVB. The force generator is disposed within the first annular groove. The force generator is forcibly engaged with the seal housing and the movable seal and is arranged radially adjacent to the seal within the first annular groove.

In an example embodiment, the actuator rotates the RVB to any one of an angular position within a continuous range of angular positions. In a further aspect, the actuator includes an electric motor configured to move or rotate the RVB to any one of an angular position within a continuous range of angular positions.

In an example embodiment, the CCV includes: i) a first outlet or a first inlet having a first seal housing and a first movable seal, and ii) a second outlet or a second inlet having a second seal housing and a second movable seal. In a further aspect, the first outlet or the first inlet and the second outlet or the second inlet can be arranged in an opposed configuration. In yet a further aspect, the first movable seal is configured to move along a second axis, and the second movable seal is configured to move along a third axis collinear with the second axis, and the second and third axes are orthogonal to the first axis.

In an example embodiment, the RVB includes an inlet opening configured to receive incoming coolant. In a further aspect, the inlet opening is integral with a first end of the RVB. In yet a further aspect, the inlet opening extends into a coolant manifold housing separate from CCV. The meaning of "separate from the CCV" is that the coolant manifold is a separate and distinct component that is not part of the CCV assembly.

In an example embodiment, an inlet pathway of the CCV is parallel to the first axis about which the RVB rotates.

In an example embodiment, the first annular groove is arranged on a first axial face of the seal housing, and the valve housing further comprises a second annular groove arranged on a second axial face of the seal housing that is configured to receive a second seal.

In an example embodiment, the seal housing can be fixed to an inlet or an outlet of the valve housing.

In an example embodiment, a radial line extending orthogonally from the second axis (along which the first or second movable seal moves) passes through a first wall of the seal housing and then subsequently passes through the movable seal, the force generator, a second wall of the first seal housing, the valve housing, and then intersects the actuator housing.

In an example embodiment, a first end of the RVB is driven by the actuator, and a second end of the rotary valve body includes an inlet opening integral with the second end of the RVB.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
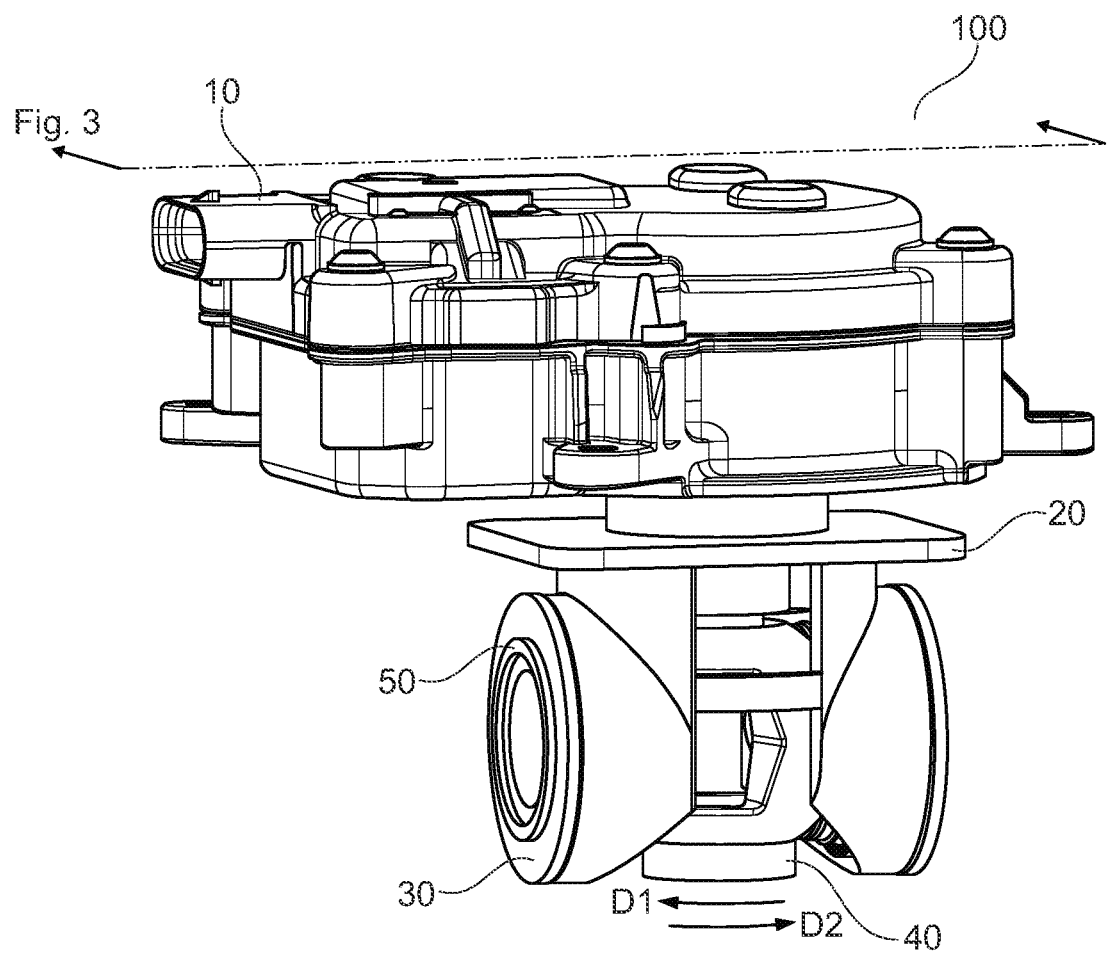
FIG. 1 is a perspective view of an example embodiment of a coolant control valve (CCV).
Figure 2:
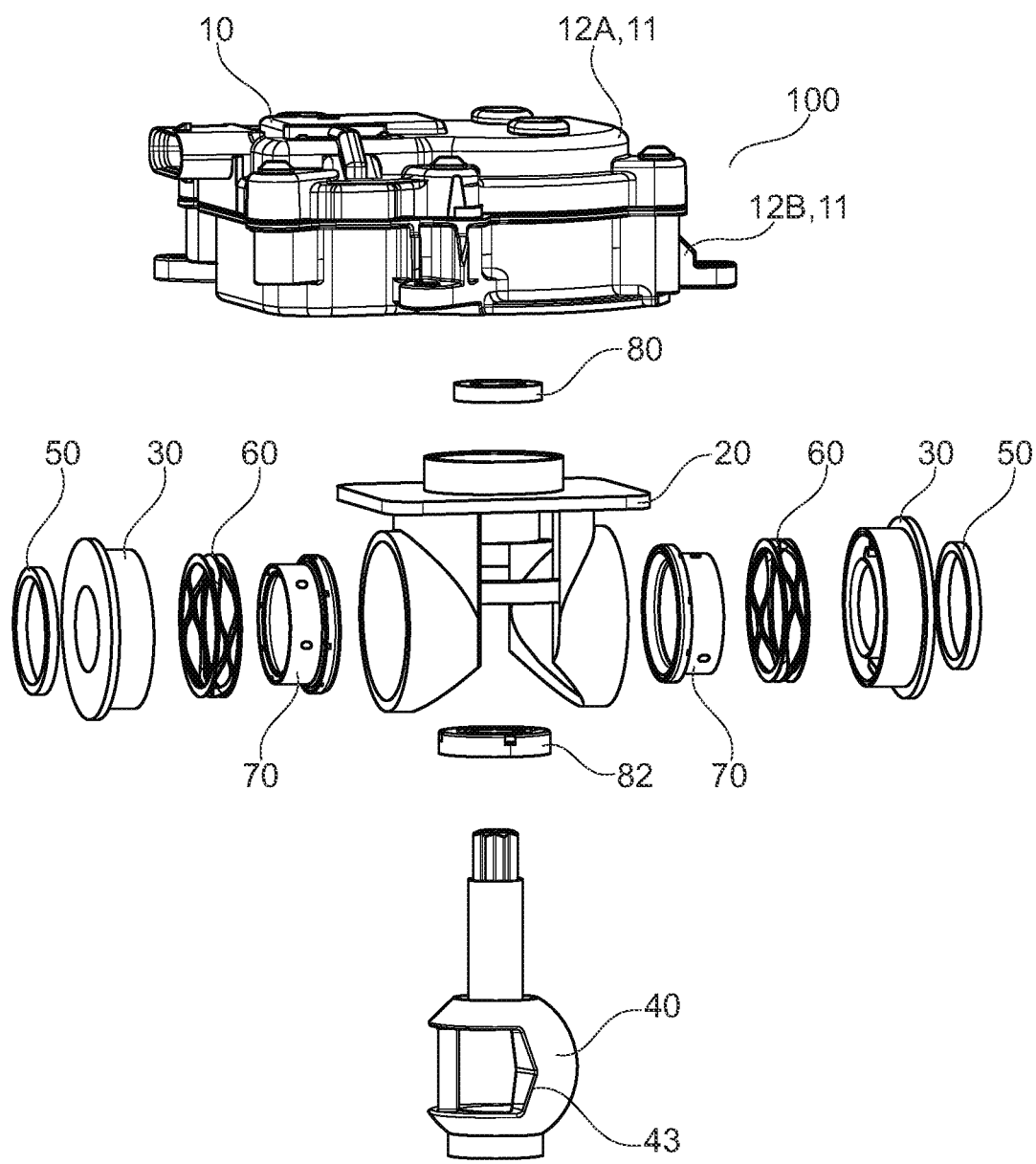
FIG. 2 is an exploded perspective view of the CCV of FIG. 1.
Figure 3:
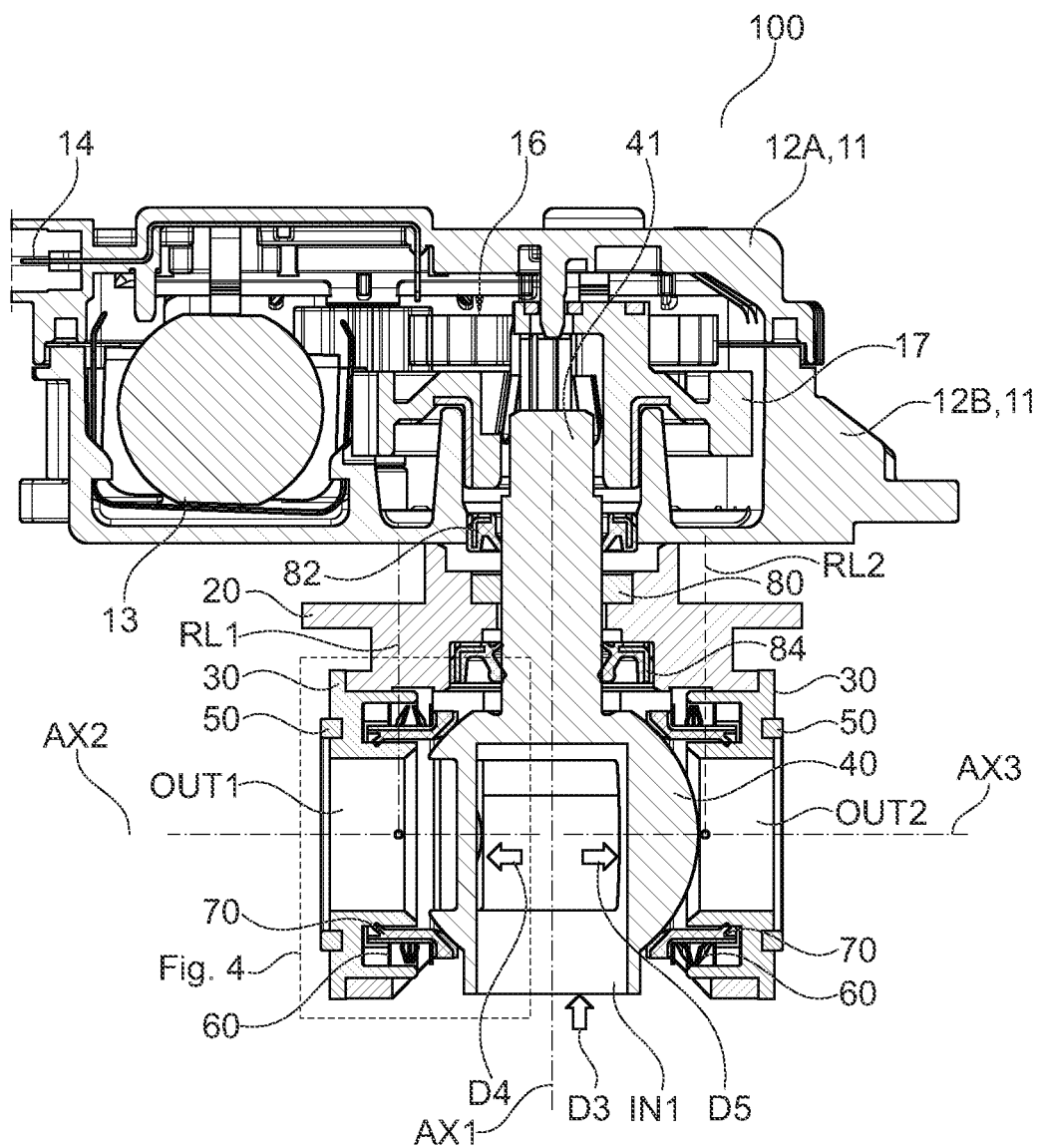
FIG. 3 is a cross-sectional view taken from FIG. 1.
Figure 4:
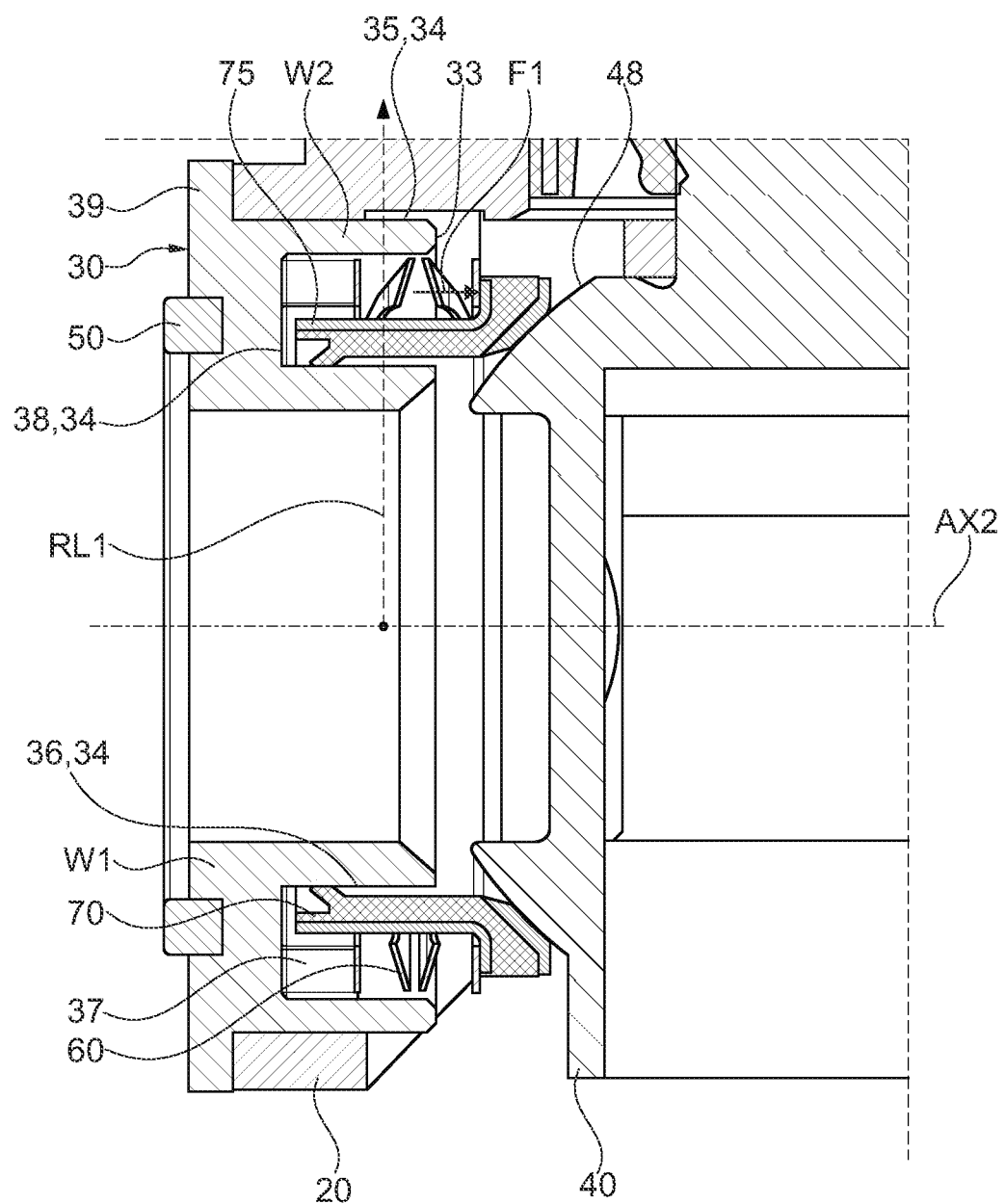
FIG. 4 is a detailed view taken from FIG. 3.
Figure 5A:
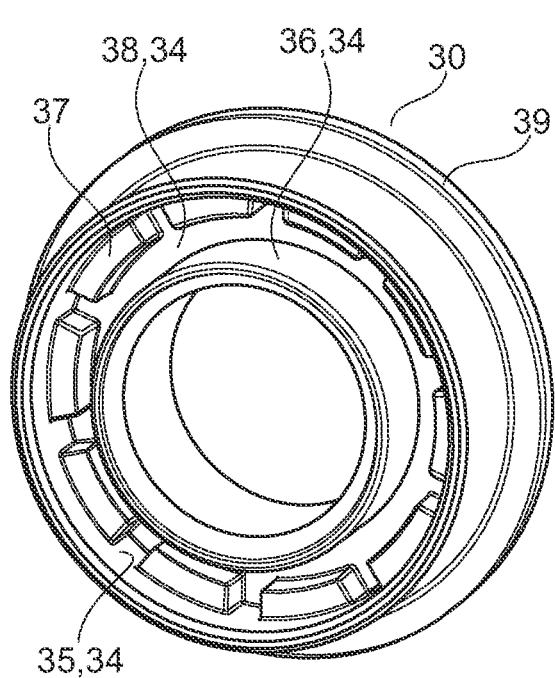
FIG. 5A is a perspective view of an example embodiment of a seal housing.
Figure 5B:
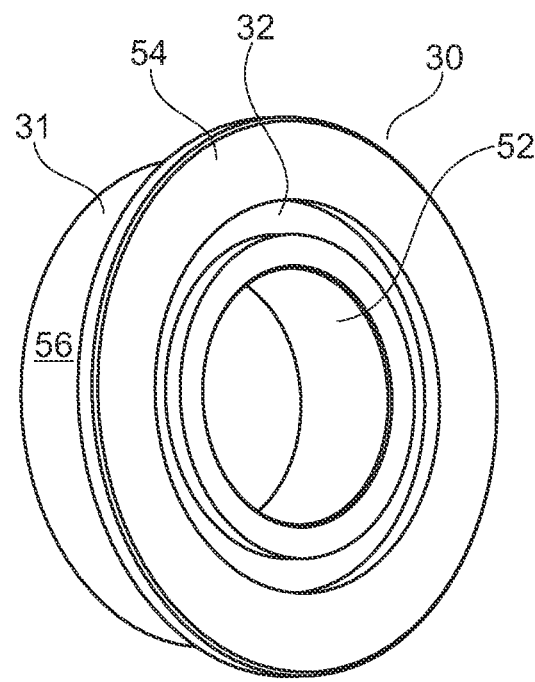
FIG. 5B is another perspective view of the seal housing of FIG. 5A.
Figure 6A:
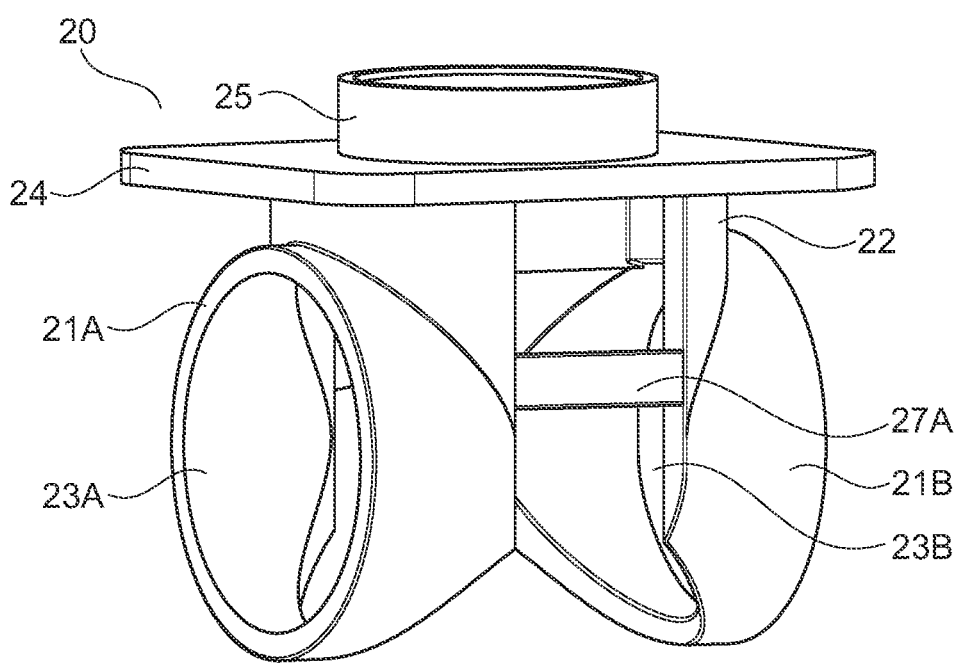
FIG. 6A is a perspective view of an example embodiment of a valve housing.
Figure 6B:
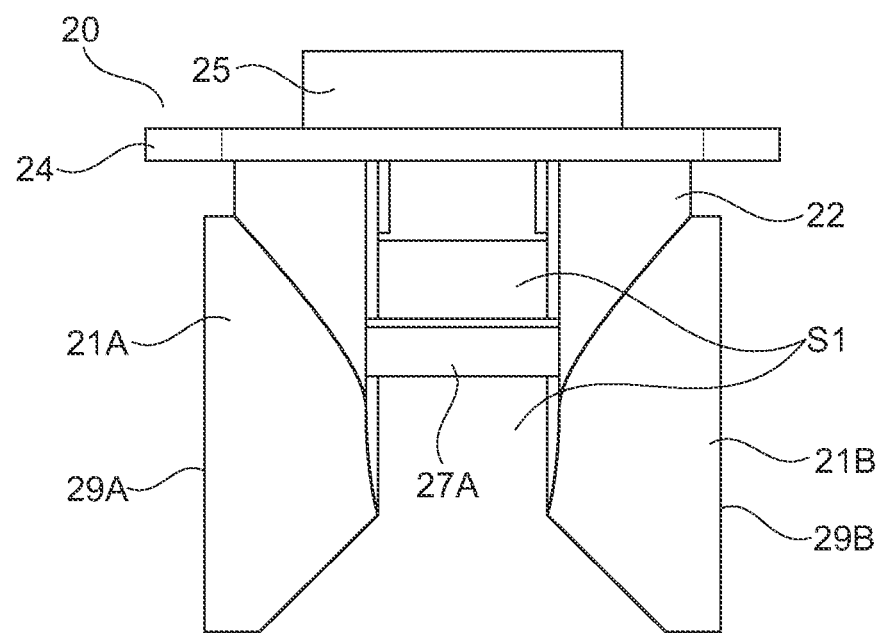
FIG. 6B is a front view of the valve housing of FIG. 6A.
Figure 6C:
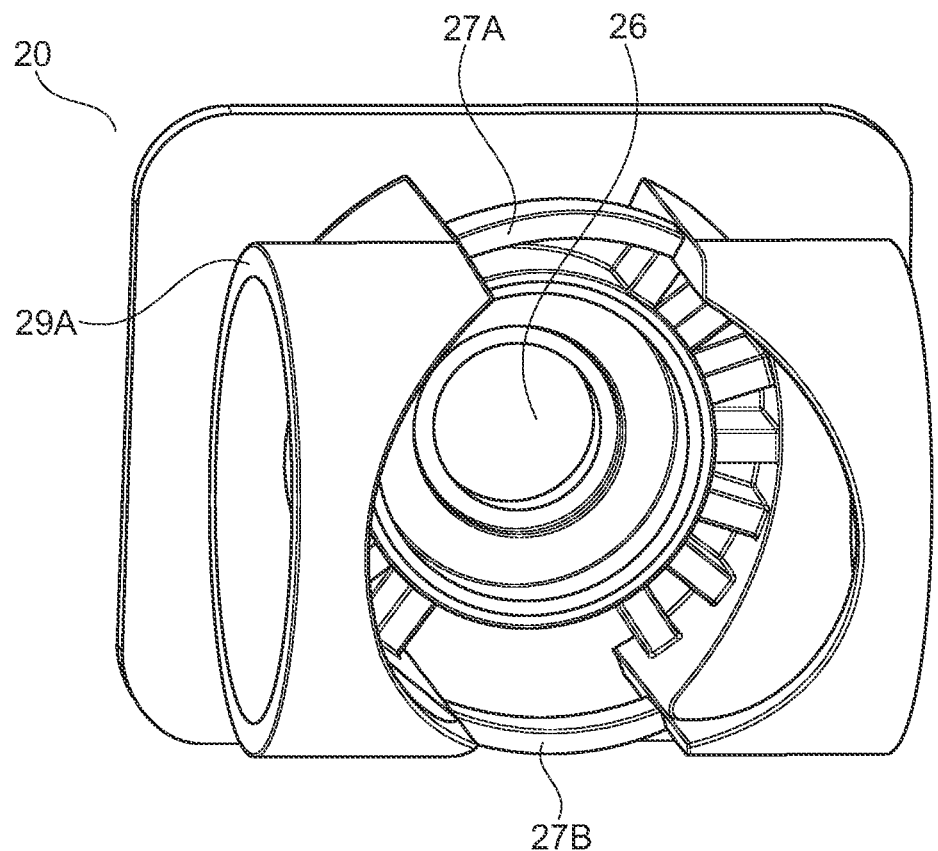
FIG. 6C is a perspective view of the valve housing of FIG. 6A.
Figure 7:
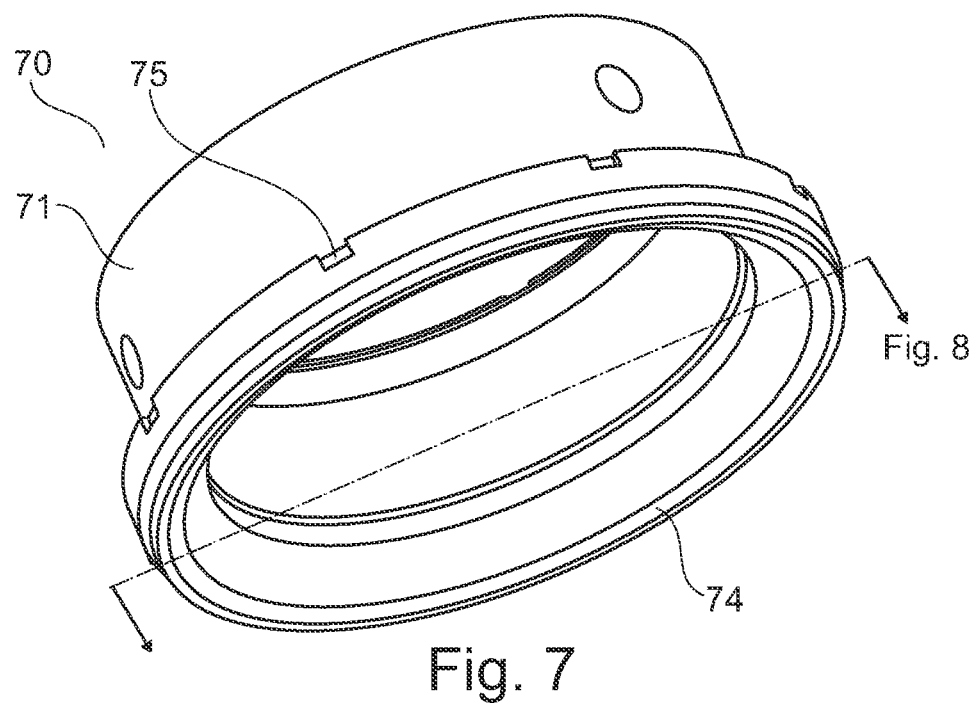
FIG. 7 is a perspective view of an example embodiment of a movable seal.
Figure 8:
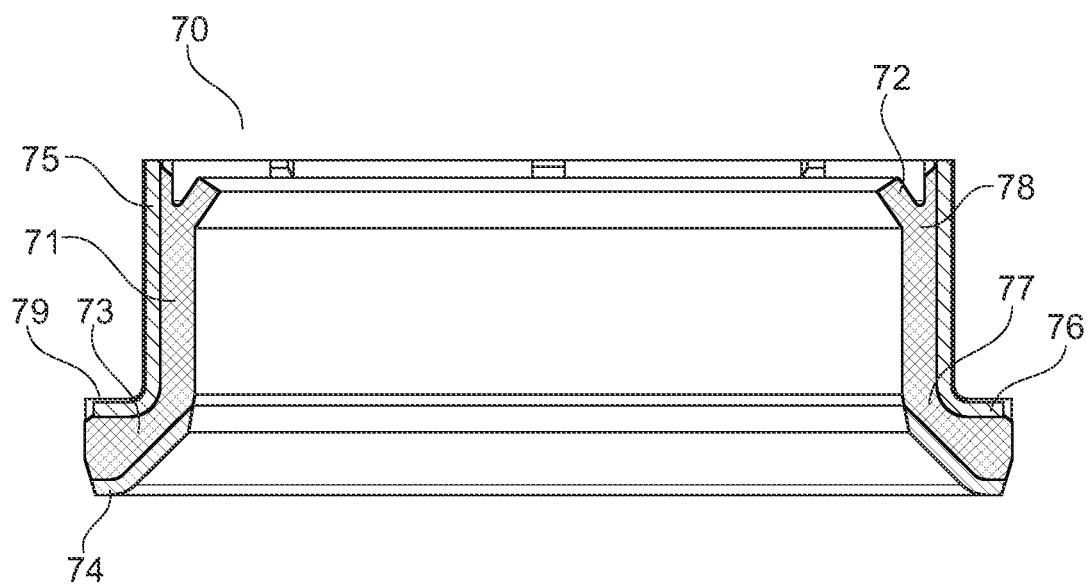
FIG. 8 is a cross-sectional view taken from FIG. 7.
Figure 9A:
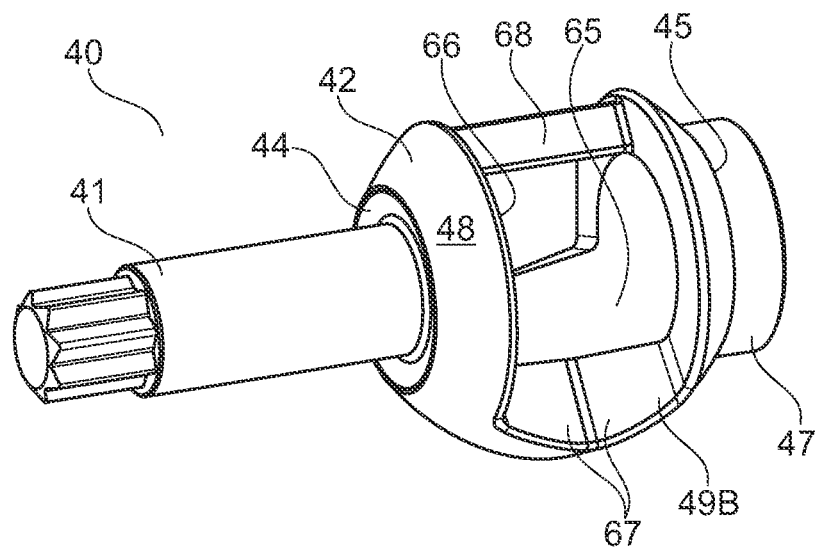
FIG. 9A is a perspective view of an example embodiment of a rotary valve body (RVB).
Figure 9B:
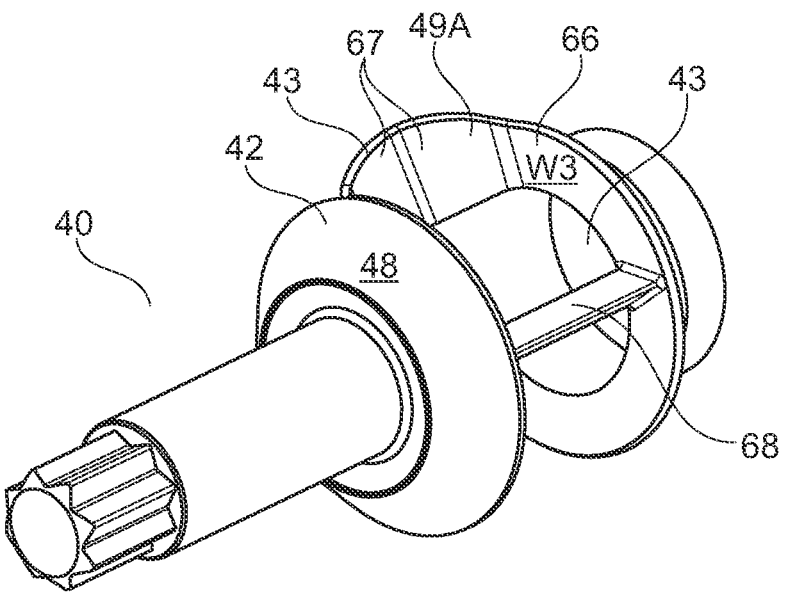
FIG. 9B is another perspective view of the RVB of FIG. 9A.
Figure 10:
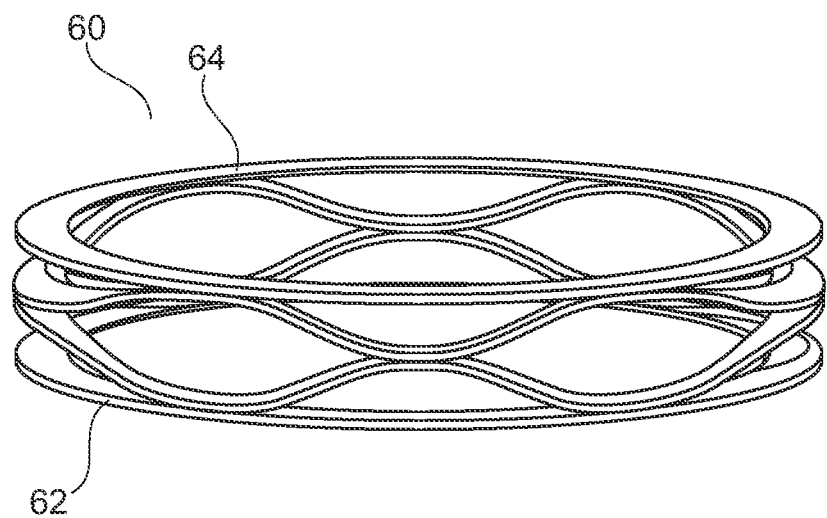
FIG. 10 is a perspective view of an example embodiment of a force generator.
Figure 11A:
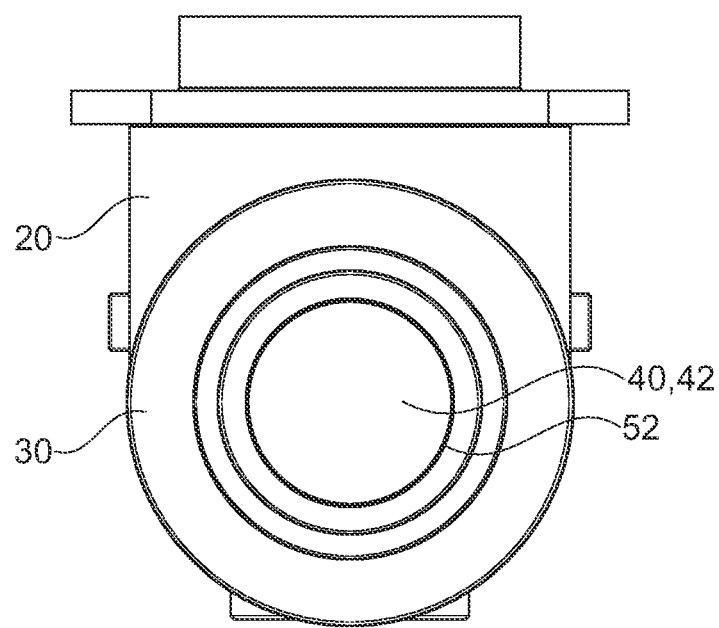
FIG. 11A is a side view of the RVB and a seal housing in a first angular position of the RVB.
Figure 11B:
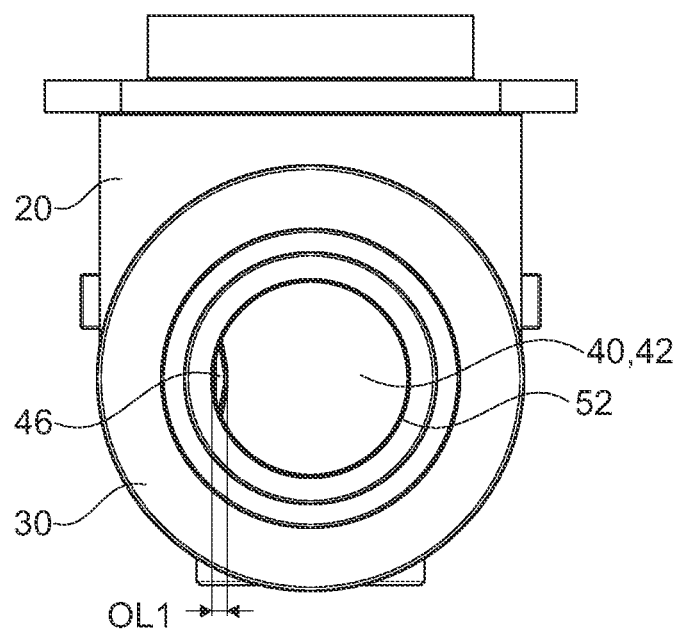
FIG. 11B is a side view of the RVB and the seal housing in a second angular position of the RVB.
Figure 11C:
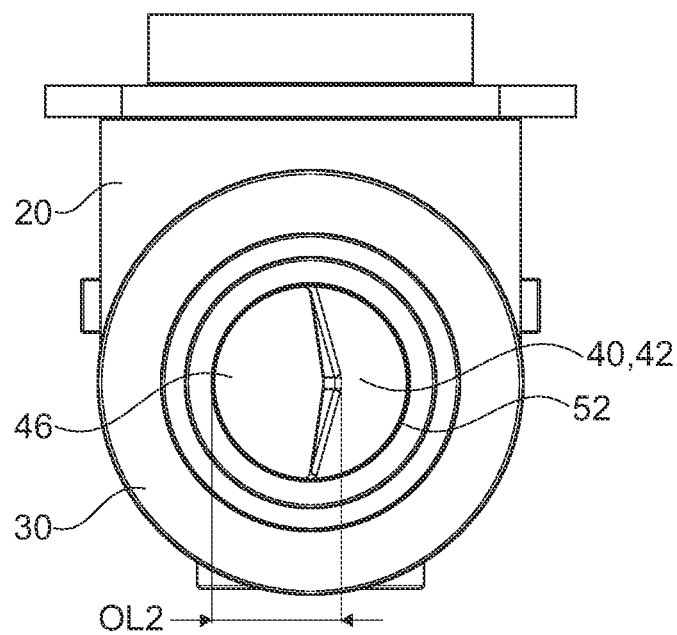
FIG. 11C is a side view of the RVB and the seal housing in a third angular position of the RVB.
Figure 11D:
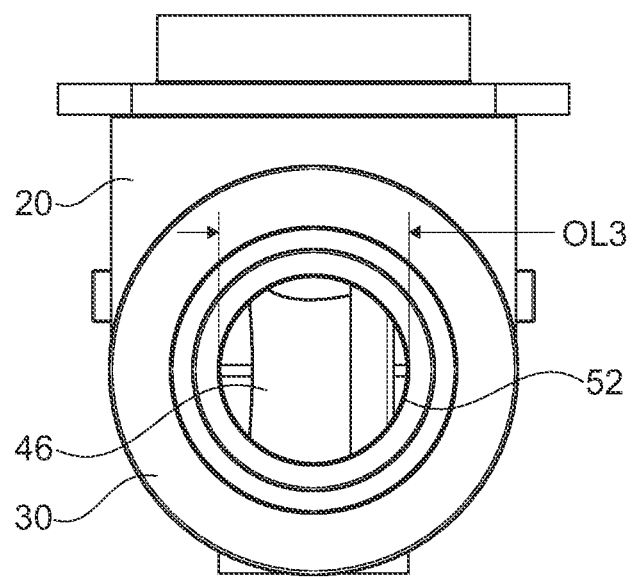
FIG. 11D is a side view of the RVB and the seal housing in a fourth angular position of the RVB.
Figure 12:
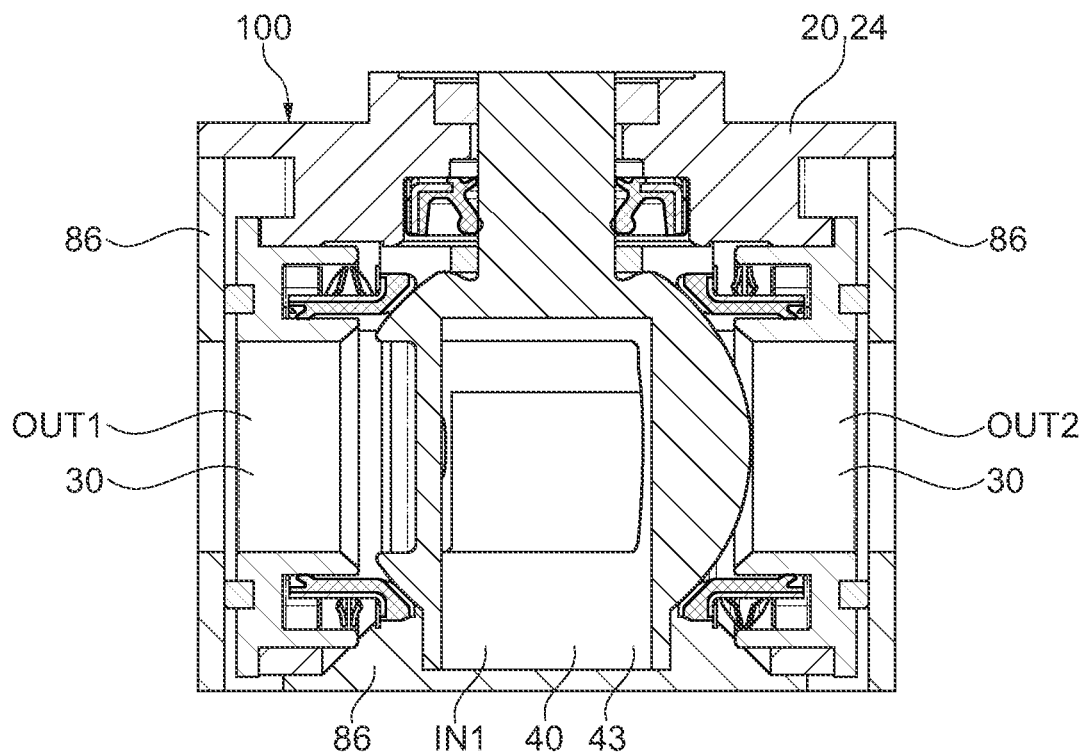
FIG. 12 is a cross-sectional view of the coolant control valve of FIG. 1 together with a coolant manifold.
Figures 13, 14:
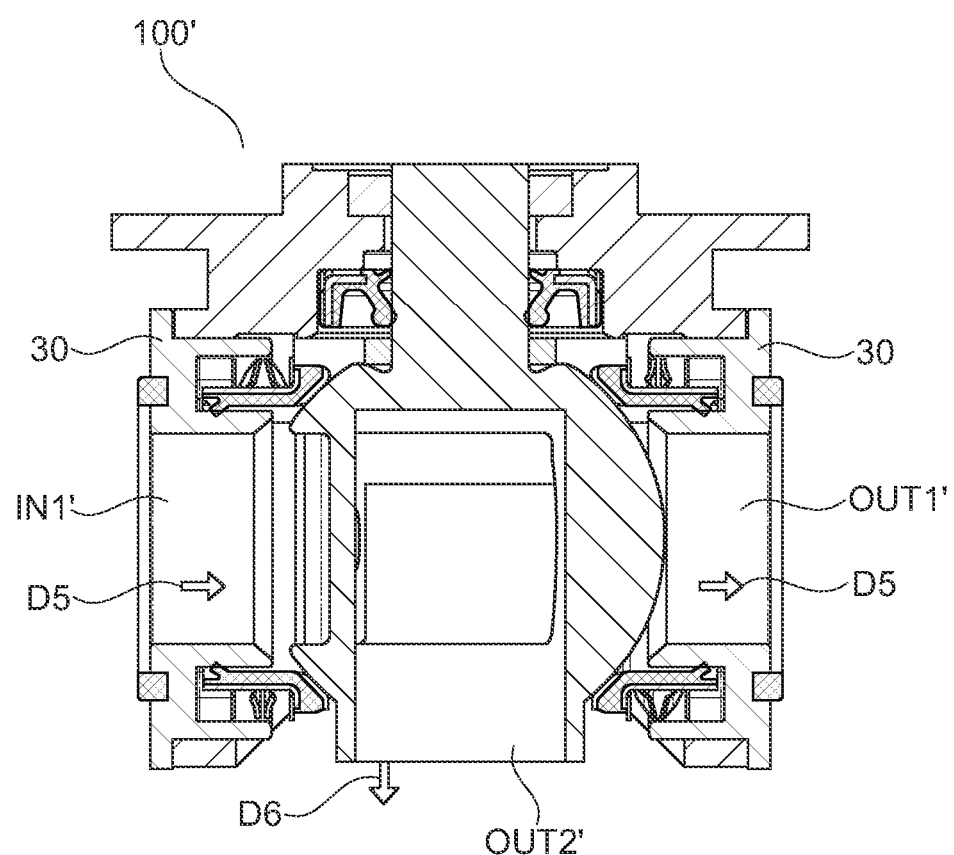
FIG. 13 is a tabular representation of exemplary flow states of the CCV of FIG. 1 are shown.
FIG. 14 is a cross-sectional view that shows an alternative inlet and outlet arrangement of a CCV.
Figure 15:
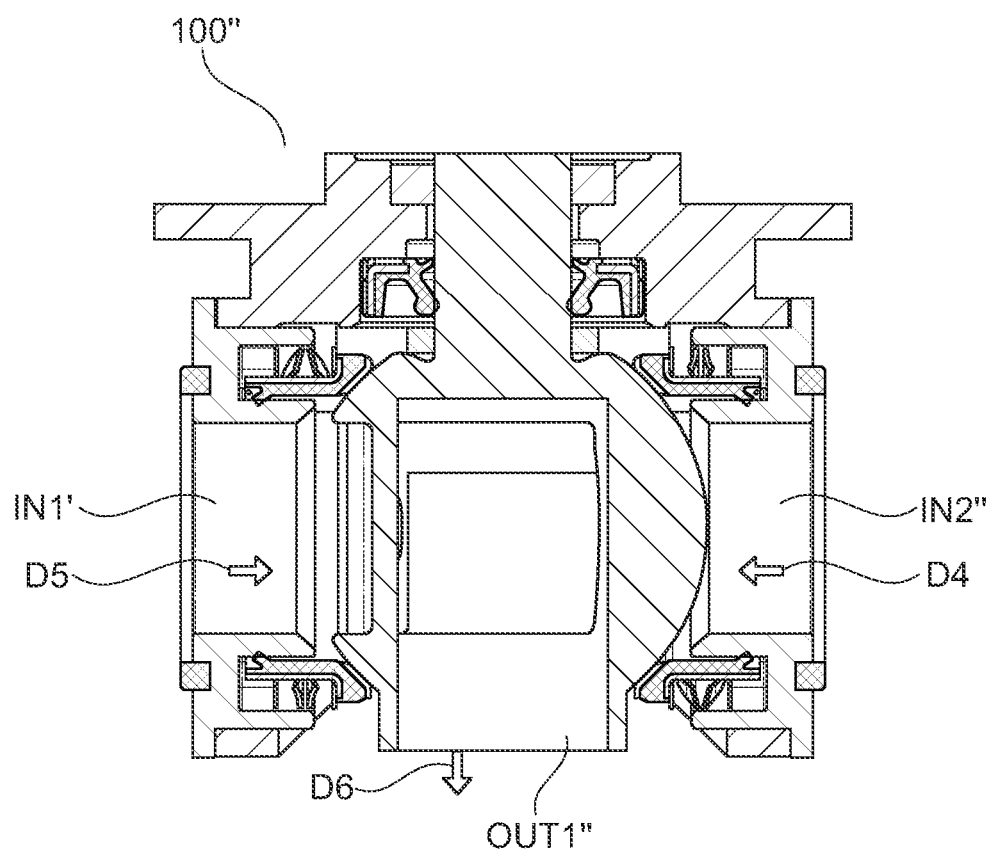
FIG. 15 is a cross-sectional view that shows another alternative inlet and outlet arrangement of a CCV.

FIG. 1 shows a perspective view of a coolant control valve (CCV) 100. FIG. 2 shows an exploded perspective view of the CCV 100 of FIG. 1. FIG. 3 shows a cross-sectional view taken from FIG. 1. FIG. 4 shows a detailed view taken from FIG. 3. FIGS. 5A and 5B show perspective views of an example embodiment of a seal housing 30. FIG. 6A shows a perspective view of a valve housing 20. FIG. 6B shows a front view of the valve housing 20. FIG. 6C shows another perspective view of the valve housing 20. FIG. 7 shows a perspective view of an example embodiment of a movable rotary valve seal (MRVS) 70. FIG. 8 is a cross-sectional view taken from FIG. 7. FIGS. 9A and 9B show perspective views of an example embodiment of a rotary valve body (RVB) 40. FIG. 10 shows a perspective view of an example embodiment of a force generator 60. FIG. 11A shows a side view of the RVB 40 and the seal housing 30 of a first outlet OUT1 of the CCV 100 which shows the RVB 40 in a first angular position. FIG. 11B shows a side view of the RVB 40 and the seal housing 30 of the first outlet OUT1 of the CCV 100 which shows the RVB 40 in a second angular position. FIG. 11C shows a side view of the RVB 40 and the seal housing 30 of the first outlet OUT1 of the CCV 100 which shows the RVB 40 in a third angular position. FIG. 11D shows a side view of the RVB 40 and the seal housing 30 of the first outlet OUT1 of the CCV 100 which shows the RVB 40 in a fourth angular position. FIG. 12 shows a cross-sectional view of the CCV 100 together with a coolant manifold 86. FIG. 13 shows a tabular representation of exemplary flow states of the CCV 100. FIGS. 14 and 15 show cross-sectional views that depict alternative CCV inlet and outlet arrangements. The following discussion should be ready in light of FIGS. 1 through 15.

The CCV 100 includes an actuator 10, the RVB 40, the valve housing 20, two seal housings 30, and two movable rotary valve seals (MRVS) 70. The actuator 10 includes an electric motor 13 and a geartrain 16 that is housed by a two-piece actuator housing 11 having a first housing piece 12A and a second housing piece 12B. A drive gear 17 of the geartrain 16 is torsionally coupled to an end of a shaft 41 of the RVB 40. The actuator 10 is controlled by an electronic controller such as a vehicle or engine controller or a dedicated CCV controller within the CCV 100 or remote from the CCV 100. The actuator 10 can be selectively energized by the electronic controller to rotate the RVB 40 about a first axis AX1 via the electric motor 13 and geartrain 16 to any angular position within a continuous range of angular positions, as determined by the electronic controller and communicated to the actuator 10 via an electrical connection 14. Alternatively stated, an angular position of the RVB 40 is "continuously variable", as opposed to achieving only a small number of discrete angular positions. Furthermore, the RVB 40 can stop at a desired angular position and rotate in both directions D1, D2 from the stop position to achieve another desired angular position. In a further example embodiment, the CCV 100 can be an on/off type that provides either a fixed coolant flow state or a no-flow state. In yet a further example embodiment, the actuator 10 rotates the RVB 40 to a small number of pre-selected non-variable angular positions.

Turning to FIGS. 9A and 9B, the RVB 40 includes a spherical segment 42 (which can be described as a sphere that is truncated on opposite ends), a shaft 41, and a tubular extension 47. The shaft 41 extends from a first truncated end 44 of the spherical segment 42 and is sealingy engaged with the second housing piece 12B via a first shaft seal 82 (FIG. 3). The tubular extension 47 extends from a second truncated end 45 of the spherical segment 42.

The spherical segment 42 has a wall W3 that defines a hollow 65. In addition, the spherical segment 42 includes a fluid opening 46 that extends: i) circumferentially around a portion of the spherical segment 42, and ii) radially from an outer surface 48 of the spherical segment 42 to the hollow 65. The fluid opening 46 extends through the wall W3 and has a first end 49A and a second end 49B. The fluid opening 46 defines a perimeter with circumferential perimeter surfaces 66 and end perimeter surfaces 67. A crossbar 68 extends axially between the circumferential perimeter surfaces 66 for stiffening purposes. The tubular extension 47 and the second truncated end 45 define an inlet fluid opening 43 that directs incoming coolant or fluid from a coolant manifold 86 (see FIG. 12). Therefore, the tubular extension 47 is representative of an inlet IN1 for the CCV10. The tubular extension 47 (and its corresponding inlet fluid opening 43) is fluidly connected to the hollow 65, and thus also to the fluid opening 46 of the spherical segment 42.

Turning to FIG. 3, the coolant flows through the tubular extension 47 in a direction D3 and, depending on the angular position of the RVB 40, can flow out of the spherical segment in a direction D4 and/or in a direction D5 to exit the valve housing 20 via respective first and second outlets OUT1, OUT2 (see FIG. 3), which are arranged in an opposed configuration or 180 degrees apart. The direction of incoming coolant flow D3 is orthogonal to the directions of output coolant flow D4, D5. As shown in the figures, the spherical segment 42, the shaft 41, and the tubular extension of the RVB 40 are constructed of one piece. In an example embodiment, the RVB 40 is injection molded from plastic. In further example embodiments, the RVB 40 can utilize overmolding or insert molding and may include metal components to improve durability or fitment characteristics of the RVB 40. Additionally, the RVB 40 can be two separate parts that are assembled together; for example, the shaft 41 can be a separate component that attaches to the spherical segment 42.

Turning to FIGS. 11A-11D, four exemplary angular positions of the RVB 40 are shown that yield four different fluid flow conditions of the CCV 100. It should be stated that these four angular positions are four of several different angular positions and associated flow conditions that are possible with the CCV 100. FIG. 11A shows a first angular position of the RVB 40 that yields a zero-flow (or "no flow") condition in which no overlap occurs between the fluid opening 46 and the through-bore 52 of the seal housing 30. In an example embodiment, the through-bore 52 represents that of the first outlet OUT1 of the CCV 100; in further example embodiments, the through-bore 52 can represent the second outlet OUT2 or the inlet IN1 of the CCV 100. FIG. 11B shows a second angular position of the RVB 40 that yields a first throttled flow condition provided by a first overlap OL1 between the fluid opening 46 and the through-bore 52 of the seal housing 30. FIG. 11C shows a third angular position of the RVB 40 that yields a second throttled flow condition provided by a second overlap OL2 between the fluid opening 46 and the through-bore 52 of the seal housing 30. It should be noted that the third angular position of the RVB 40 can yield a greater flow through the through-bore 52 of the seal housing 30 since the second overlap OL2 is greater than the first overlap OL1. FIG. 11D shows a fourth angular position of the RVB 40 that yields a full-flow or non-throttled state provided by a third overlap OL3 between the fluid opening 46 and the through-bore 52 of the seal housing 30 that is greater than the throttled first and second overlaps OL1, OL2 of FIGS. 11B and 11C. In this flow condition the fluid opening 46 completely spans a diameter of the through-bore 52.

Turning to FIG. 13, a tabularization of exemplary flow states A, B, and C are shown. Within the table, numerical percentages represent a magnitude of openness of the first and second outlets OUT1, OUT2. A 0% magnitude represents a closed or no-flow state such as that shown in FIG. 11A when no portion of the fluid opening 46 overlaps with the through-bore 52 of the valve housing 20. A 100% magnitude represents a full-flow state such as that shown in FIG. 11D where the fluid opening 46 completely overlaps the through-bore 52 of the seal housing 30. Referring to the table of FIG. 13, in a Flow State A, when the first outlet OUT1 is closed or has a no-flow state, the RVB 40 can be adjusted to provide a flow state of the second outlet OUT2 that ranges between a value which is greater than 0% and less than or equal to 100%. In a Flow State B, when the second outlet OUT2 is closed or has a no-flow state, the RVB 40 can be adjusted to provide a flow state of the first outlet OUT1 that ranges between a value which is greater than 0% and less than or equal to 100% (a "throttled" or variable flow state). In a Flow State C, the first outlet OUT1 can be adjusted via the RVB 40 to achieve an X % flow state that is greater than 0% and less than or equal to 100%, and the second outlet OUT2 can be adjusted via the RVB 40 to achieve a flow state that is 100%-X %; therefore, both the first and the second outlets OUT1, OUT2 can be simultaneously throttled.

Turning to FIGS. 6A-6C, the valve housing 20 includes a central cylindrical portion 22 that is adjoined with a first cylindrical portion 21A and a second cylindrical portion 21B. It could be stated that the first cylindrical portion 21A is connected to the second cylindrical portion 21B via the central cylindrical portion 22. Furthermore, it could be stated that the first and second cylindrical portions 21A, 21B are arranged in an opposed configuration in which the first and second cylindrical portions 21A, 21B are arranged 180 degrees apart. The first axis AX1 defines a center of the central cylindrical portion 22. A second axis AX2 defines a center of the first cylindrical portion 21A and a third axis AX3 defines a center of the second cylindrical portion 21B. The first axis AX1 is orthogonal to the second and third axes AX2, AX3, and the second and third axes AX2, AX3 are collinear; however, in further example embodiments, these relationships do not hold true. First and second struts 27A, 27B provide structural support and rigidity of the central cylindrical portion. The first and second cylindrical portions 21A, 21B define a space S1 between them. The RVB 40 is disposed in this space S1 and within a portion of the first and second bores 23A, 23B of the respective first and second cylindrical portions 21A, 21B.

The valve housing 20 also includes a flange 24 which abuts with the coolant manifold 86 (see FIG. 12) to determine a proper installed position within the coolant manifold 86. The central cylindrical portion 22 extends from a bottom of the flange 24 and a cylindrical protuberance 25 extends from the top of the flange 24 and abuts with the second housing piece 12B of the housing 11. A through-aperture 26 extends through the cylindrical protuberance 25, flange 24, and the central cylindrical portion 22 and connects to the space S1 formed by the first and second cylindrical portions 21A, 21B. The through-aperture 26 defines multiple portions with different diameters that provide: i) axial and radial retainment of a rolling element bearing 80 configured to support the shaft 41 of the RVB 40 which extends through the through-aperture 26, and ii). axial and radial retainment of a second shaft seal 84 that sealingly engages the shaft 41.

Turning to FIGS. 3, 4, 5A, and 5B, a seal housing 30 is fixed to each of the first and second cylindrical portions 21A, 21B of the valve housing 20. In an example embodiment, a cylindrical portion 31 of the seal housing 30 is fixed to the respective first and second bores 23A, 23B via a press fit. Other suitable means of attaching the seal housing 30 to the valve housing 20 are also possible. The seal housings 30 are pressed into the first and second bores 23A, 23B until a flange 39 of the seal housing 30 abuts with respective first and second axial faces 29A, 29B of the first and second cylindrical portions 21A, 21B.

The seal housing 30 provides a means of: i) sealing the RVB 40 to the respective first and second outlets OUT1, OUT2, ii) sealing the first and second outlets OUT1, OUT2 to the coolant manifold 86, and iii) flowing coolant from the RVB 40 to the coolant manifold 86. An outer seal annular groove 32 is arranged on an outer axial face 54 and a valve seal annular groove 34 is arranged on an inner axial face 33. The outer seal annular groove 32 houses a seal 50 or any other suitable seal that mounts within the outer seal annular groove 32 to seal the seal housing 30 to the coolant manifold 86. The valve seal annular groove 34 houses a portion of a movable rotary valve seal (MRVS) 70 and a force generator 60, such that each of the MRVS 70 and the force generator 60 are seated within the groove and extend axially outside of the groove toward the spherical segment 42 of the RVB 40 (relative to the second and third axes AX2, AX3). The seal housing 30 includes the previously referenced through-bore 52 configured to facilitate coolant flow from the RVB 40 to the coolant manifold 86. While FIG. 12 shows a single CCV 100 added or mounted to the coolant manifold 86, further example embodiments include multiple CCVs that are added or mounted to the coolant manifold 86.

Turning to FIGS. 7 and 8, the MRVS 70 includes an elastomeric tubular portion 71, a metal reinforcement ring 75, and an optional polytetrafluoroethylene (PTFE) coating 74 or layer. The elastomeric tubular portion 71 includes an angular base 73 at an axial inner end 77 and a radially inwardly protruding annular lip 72 at an axially outer end 78. The angular base 73 is angled to facilitate sealing of a curved or spherical outer surface 48 of the spherical segment 42. The radially inwardly protruding annular lip 72 slidably and sealingly engages a radial inner surface 36 of the valve seal annular groove 34. The metal reinforcement ring 75 includes a radially outwardly extending flange 76 and is embedded within a radially outer portion of the elastomeric tubular portion 71. The PTFE coating 74 can be applied, for example, via a heating process so that it adheres to the angular base 73 of the elastomeric tubular portion 71.

Turning to FIGS. 10 and 5A, a first end 62 of the force generator 60 engages landings 37 that extend from a base 38 of the valve seal annular groove 34. The presence of the landings 37, which can reduce the axial space requirement of the force generator 60 (and thus a force generator with a shorter axial length can be utilized), is optional. A second end 64 of the force generator 60 engages and applies a force F1 (FIG. 4) to a radially extending shelf 79 formed at the axial inner end 77 of the elastomeric tubular portion 71, with the shelf 79 being reinforced by the flange 76 of the metal reinforcement ring 75. The PTFE coated angular base 73 is forcibly sealingly engaged with an outer surface 48 of the spherical segment 42 of the RVB 40 via the force F1 provided by the force generator 60. Due to inhererent tolerances, clearances, stiffnesses, and thermal expansion of the assembled components of the CCV 100, a position of the outer surface 48 of the spherical segment 42 can change relative to the seal housing 30 as the RVB 40 is rotatably actuated; to accommodate this changing position, the MRVS 70 can move linearly or axially within the valve seal annular groove 34 to maintain sealing engagement with the outer surface 48. Thus, the MRVS 70 can be described as an axially movable spring-loaded seal that is continuously forced into engagement with the outer surface 48 regardless of its axial position. This is further facilitated by the radially inwardly protruding annular lip of the MRVS 70 which can slide on the radial inner surface 36 of the valve seal annular groove 34 in an axial direction while maintaining sealing engagement. Given the mobility of the MRVS 70, the previously described second and third axes AX2, AX3 can also be considered as displacement axes or translation axes for the respective MRVS's of the first and second outlets OUT1, OUT2.

The force generator 60 is shown as a compression spring, particularly, a wave compression spring, within the figures; however, any suitable force generating component that accommodates a variable axial position of the MRVS 70 could be utilized, including, but not limited to elastomeric components.

As shown in the figures, the seal housing 30, force generator 60, MRVS 70, and seal 50 are duplicated on each of the first outlet OUT1 and the second outlet OUT2. In an example embodiment, the first and second outlets OUT1, OUT2 have different seal housings, which require correspondingly different force generators, MRVS's, and seals. In a further example embodiment, the first and second cylindrical portions 21A, 21B of the valve housing 20 are arranged in a non-opposed configuration such that the first and second outlets OUT1, OUT2 are also arranged in a non-opposed configuration.

The arrangement of the force generator 60 radially adjacently to the MRVS 70 provides for a compact design, reducing a distance from the first axis AX1, about which the RVB 40 rotates, to an outermost extent of the first and second outlets OUT1, OUT2. Referring to FIGS. 3 and 4, the radial adjacency of the force generator and the MRVS 70 can be pictorially described by a first radial line RL1 that extends orthogonally from the second axis AX2 to the actuator housing 11. The first radial line RL1 first extends through (or passes through) a wall W1 of the cylindrical portion 31 of the valve housing 20 defined by the through-bore 52 and the radial inner surface 36 of the valve seal annular groove 34. The first radial line RL then extends through the elastomeric tubular portion 71 (first) and the metal reinforcement ring 75 (second) of the MRVS 70. The first radial line RL1 then extends through the force generator 60 (first) and a wall W2 of the cylindrical portion 31 of the valve housing 20 defined by a radial outer surface 35 of the valve seal annular groove 34 and the radial outer surface 56 of the cylindrical portion 31 of the seal housing 30. Once exiting the second wall W2, the first radial line extends through the valve housing 20 before intersecting the second housing piece 12B of the actuator housing 11.

Based on the previous discussion, it could be stated that the first radial line RL1 extends orthogonally from the second axis AX2 and extends successively or consecutively through: the first wall W1, the elastomeric tubular portion 71, the metal reinforcement ring 75, the force generator 60, the second wall W1, and the second housing piece 12B of the actuator housing 11. The terms "successively" and "consecutively" are meant to signify that the first radial line RL1 extends through the named components in the listed order without encountering other components (or other listed components). In a further example embodiment, it could be stated that first radial line RL1 extends through (or passes through) the first wall W1 and then subsequently passes through the elastomeric tubular portion 71, the metal reinforcement ring 75, the force generator 60, the second wall W2, and the valve housing 20 before interesting the second housing piece 12B of the actuator housing 11. The term "subsequently", in this instance, is meant to signify, for example, that the first radial line RL1 extends through the elastomeric tubular portion 71 after extending through the first wall W1. In this example embodiment, other components may reside between the first wall 1 and the elastomeric tubular portion 71.

FIGS. 14 and 15 show alternative inlet and outlet arrangements for a CCV 100', 100". In FIG. 14, the CCV 100' includes an inlet IN1' and first and second outlets OUT1', OUT2'. The inlet IN1' and the first outlet OUT1' are arranged in an opposed configuration such that coolant flows into the inlet Inl' and out of the first outlet OUT1' in the direction D5. Furthermore, coolant flows out of the second outlet OUT2' in the direction D6 that is orthogonal to the direction D5.

In FIG. 15, the CCV 100" includes a first inlet IN1", a second inlet IN2", and an outlet OUT1". The first and second inlets IN1", IN2" are arranged in an opposed configuration such that coolant flows into the first inlet IN1" in the direction D5 and into the second inlet IN2" in the direction D4. Furthermore, coolant flows out of the outlet OUT1" in the direction D6 that is orthogonal to the directions D4, D5.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A coolant control valve comprising:
an actuator;
a rotary valve body actuated about a first axis by the actuator, the rotary valve body having at least one fluid opening configured to rotate about the first axis;
a valve housing comprising at least one inlet and at least one outlet;
a seal housing corresponding to at least one of the at least one inlet or the at least one outlet, the seal housing comprising:
a first annular groove;
a movable seal: i) configured to move along a second axis, and ii) disposed within the first annular groove, the movable seal having:
a first seal portion sealingly engaged with the first annular groove;
a second seal portion sealingly engaged with the rotary valve body; and
a tubular portion extending axially between the first seal portion and the second seal portion relative to the second axis; and
a force generator disposed within the first annular groove, the force generator:
forcibly engaged with the seal housing and the movable seal; and,
arranged radially adjacent to the tubular portion of the seal within the first annular groove relative to the second axis.

2. The coolant control valve of claim 1, wherein the actuator rotates the rotary valve body to any one of an angular position within a continuous range of angular positions.

3. The coolant control valve of claim 1, wherein the second axis is arranged orthogonal to the first axis.

4. The coolant control valve of claim 1, further comprising:
a first seal housing corresponding to the at least one of the at least one outlet or the at least one inlet having a first movable seal; and,
a second seal housing corresponding to the at least one of the at least one outlet or the at least one inlet having a second movable seal.

5. The coolant control valve of claim 4, wherein the first movable seal is configured to move along a second axis and the second movable seal is configured to move along a third axis collinear with the second axis.

6. The coolant control valve of claim 4, wherein the first movable seal is configured to move along a second axis, and the second movable seal is configured to move along a third axis collinear with the second axis, and the second and third axes are orthogonal to the first axis.

7. The coolant control valve of claim 1, wherein the rotary valve body includes an inlet opening configured to receive incoming coolant.

8. The coolant control valve of claim 7, wherein the inlet opening is integral with a first end of the rotary valve body.

9. The coolant control valve of claim 8, wherein the inlet opening of the rotary valve body is configured to extend into a coolant manifold separate from the coolant control valve.

10. The coolant control valve of claim 1, wherein the movable seal sealingly engages a spherical segment of the rotary valve body.

11. The coolant control valve of claim 1, wherein:
the first annular groove is arranged on a first axial face of the seal housing; and
the seal housing further comprises a second annular groove arranged on a second axial face of the seal housing, the second annular groove configured to receive a second seal.

12. The coolant control valve of claim 1, wherein the tubular portion is integral with the first seal portion and the second seal portion.

13. A coolant control valve comprising:
an actuator having an actuator housing;
a rotary valve body actuated about a first axis by the actuator, the rotary valve body having at least one fluid opening configured to rotate about the first axis;
a valve housing having at least one of a first outlet configured to exit coolant from the coolant control valve or a first inlet configured to receive coolant into the coolant control valve;
a first seal housing fixed to at least one of the first outlet or the first inlet, the first seal housing having a throughbore configured to flow coolant from the at least one of the first outlet or the first inlet;
a first movable seal:
configured to move along a second axis orthogonal to the first axis; and
sealingly engaged with the first seal housing and the rotary valve body; and
a force generator forcibly engaged with the first movable seal and the first seal housing; and
a radial line extending orthogonally from the second axis passes through a first wall of the first seal housing and then subsequently passes through the first movable seal, the force generator, and a second wall of the first seal housing.

14. The coolant control valve of claim 13, wherein after passing through the second wall of the first seal housing, the radial line intersects the valve housing.

15. The coolant control valve of claim 13, wherein after passing through the second wall of the first seal housing, the radial line passes through the valve housing and intersects the actuator housing.

16. The coolant control valve of claim 13, wherein a first end of the rotary valve body is driven by the actuator, and a second end of the rotary valve body includes an inlet opening configured to receive incoming coolant, the inlet opening integral with the second end of the rotary valve body.

17. The coolant control valve of claim 13, wherein the first wall of the first seal housing and the second wall of the first seal housing define an annular groove, and the first movable seal and the force generator are disposed at least partially within the annular groove.

18. A coolant control valve comprising:
   an actuator;
   a rotary valve body actuated about a first axis by the actuator, the rotary valve body having at least one fluid opening configured to rotate about the first axis;
   a valve housing having:
      an inlet configured to receive coolant into the coolant control valve; or
      an outlet configured to exit coolant from the coolant control valve; and
   a seal housing corresponding to at least one of the inlet or the outlet, the seal housing having an annular groove;
   a movable seal disposed within the annular groove and configured to move along a second axis, the movable seal comprising:
      a first end having a base sealably engaging the rotary valve body; and
      a second end having an annular lip configured to engage the annular groove; and
   a force generator disposed within the annular groove, the force generator:
      forcibly engaging the seal housing and the movable seal;
      arranged radially adjacent to the seal within the annular groove relative to the second axis; and
      arranged axially between the base and the annular lip relative to the second axis.

19. The coolant control valve of claim 18, wherein the force generator forcibly engages and abuts with the base of the movable seal.

20. The coolant control valve of claim 19 wherein the base is an angular base that engages a curved surface of the rotary valve body.

* * * * *